United States Patent [19]

Baker et al.

[11] 4,188,868

[45] Feb. 19, 1980

[54] ENERGY CONSERVER FOR BROILERS

[75] Inventors: Edward D. Baker, San Francisco; Nils Lang-Ree, Los Altos; John S. Brown, Half Moon Bay, all of Calif.

[73] Assignee: NPI Corporation, Burlingame, Calif.

[21] Appl. No.: 942,922

[22] Filed: Sep. 18, 1978

[51] Int. Cl.[2] .......................................... A47J 37/04
[52] U.S. Cl. ..................................... 99/386; 99/401; 99/447
[58] Field of Search ................. 99/386, 401, 447; 126/22; 432/148, 185, 194

[56] References Cited

U.S. PATENT DOCUMENTS

| | | | |
|---|---|---|---|
| 484,539 | 10/1892 | Munson | 126/22 |
| 2,631,523 | 3/1953 | Olving | 99/401 X |
| 3,334,620 | 8/1967 | DeWerth | 99/401 X |
| 3,372,635 | 3/1968 | Meyer | 99/386 X |
| 3,580,164 | 5/1971 | Baker | 99/386 X |
| 3,646,878 | 3/1972 | Keller | 99/386 X |
| 3,987,718 | 10/1976 | Lang-Ree et al. | 99/386 |
| 4,121,509 | 10/1978 | Baker et al. | 99/386 |

Primary Examiner—George F. Mautz
Assistant Examiner—Arthur O. Henderson
Attorney, Agent, or Firm—Lothrop & West

[57] ABSTRACT

Some commercial broilers have a conveyor extending through the broiler from an entrance opening to an exit opening and have a plurality of burner housings, including end burner housings, arranged above the conveyor and spaced apart with respect to each other and particularly with respect to the entrance opening and the exit opening to leave gaps. To conserve heat, the passageway through the broiler above the conveyor is herein restricted by baffles including an entrance shield of heat-reflecting material formed as a channel frictionally fitting over the entrance burner housing and having a baffle sheet extending from the entrance burner housing through most of the gap toward the entrance opening. Also included is an exit shield of similar material formed as a similar channel fitting over the exit burner housing and having a baffle sheet extending from the exit burner housing through most of the gap toward the exit opening. Further, there is an intermediate shield including a horizontal sheet of similar material resting on adjacent burner housings and having a vertical sheet depending from said horizontal sheet. The entrance shield, the exit shield and the intermediate shield define the upper limits of the passageway through the burner and tend to reflect heat away from the entrance and exit openings and to limit air circulation within and through the passageway.

5 Claims, 1 Drawing Figure

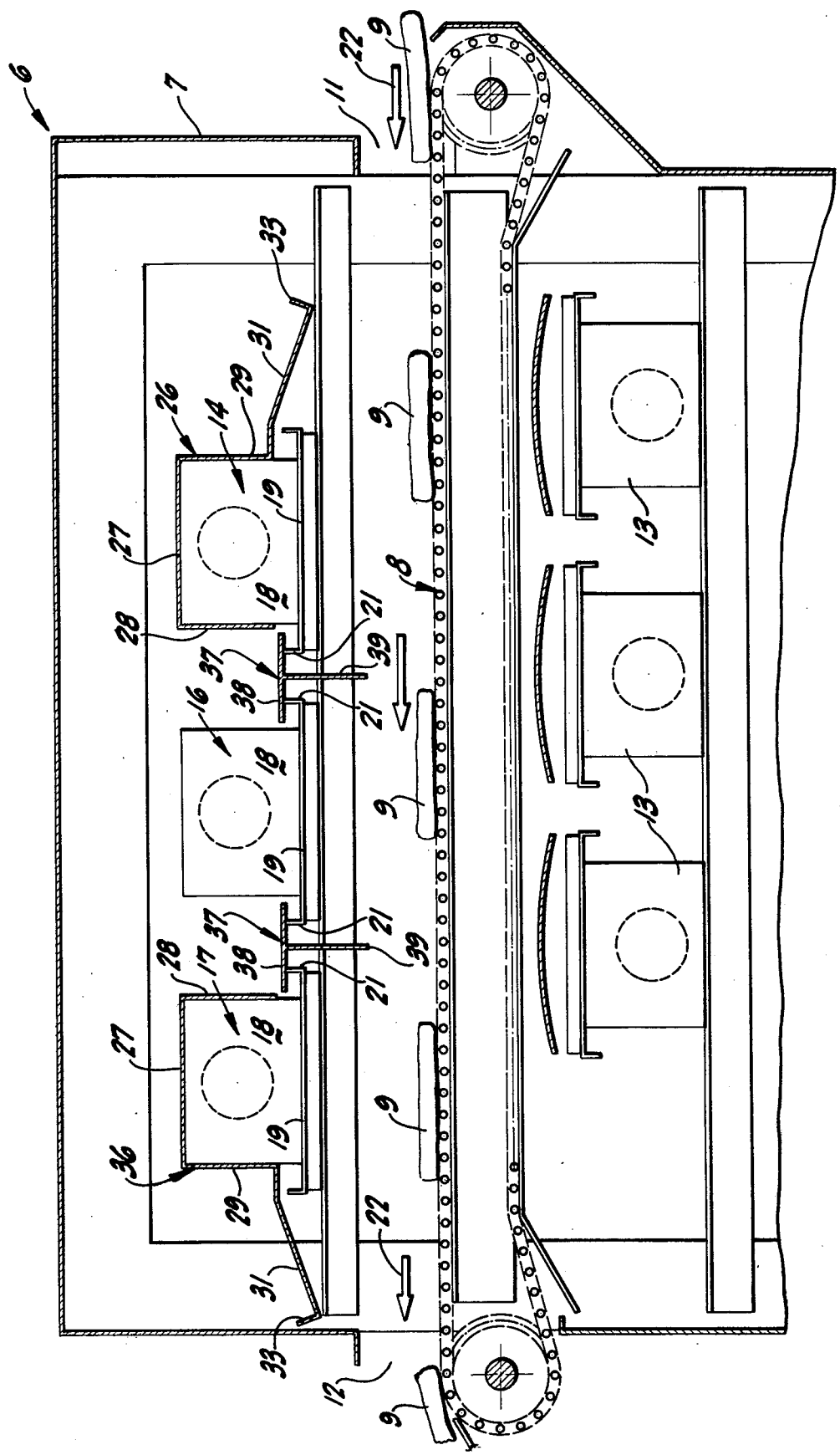

ENERGY CONSERVER FOR BROILERS

CROSS-REFERENCES TO RELATED APPLICATIONS, IF ANY

None.

BRIEF SUMMARY OF THE INVENTION

In the commercial preparation of foodstuffs, particularly hamburgers and the like, there is customarily provided a broiling mechanism including a housing containing a conveyor for advancing the hamburgers from an entrance opening to an exit opening between or at least beneath a plurality of cooking burners generally spaced apart some distance from the entrance opening and the exit opening and from each other. A good deal of the heat generated by the burners is used profitably in cooking the hamburgers, but much of it is free to circulate at random within the broiler housing to escape from the entrance opening and to escape from the exit opening, as well as to move within and through the broiler itself at a relatively rapid rate and so to become dissipated. To conserve much of the otherwise lost heat, there is provided a baffle system which can be applied to current and new broilers and which is effective to deflect some of the heat away from the entrance opening and from the exit opening and to reduce the air circulation within and through the broiler.

BRIEF DESCRIPTION OF THE SEVERAL VIEWS OF THE DRAWING

The drawing is a cross-section on a longitudinal vertical plane through a broiler constructed pursuant to the present disclosure.

DETAILED DESCRIPTION

Although the present arrangement can be embodied in a large number of different ways, it has successfully been incorporated in a typical broiler 6 including an appropriate housing 7 within which is mounted an endless conveyor 8 adapted to transport a hamburger 9 or comparable item from an entrance opening 11 to an exit opening 12. Within the broiler there is customarily provided a number of lower burners 13 and a number of upper burner housings. These latter include an entrance or end burner 14, an intermediate burner housing 16 and an exit burner housing 17. The term "burner" herein is inclusive of all cooking elements, such as gas and electric. Each of these is a substantially identical unit positioned above the conveyor 8 at a predetermined distance, and the individual burner housings are disposed with spaces between them and particularly with an entrance gap between the burner housing 14 and the entrance opening 11 and an exit gap between the exit end burner housing 17 and the exit opening 12. Each burner has a rectangular or box-like central portion 18 and includes a lower support portion 19 having flanges 21 extending transversely above the conveyor 8.

In the usual operation, the conveyor 8 advances in the direction of the arrows 22 and conveys the patty 9 throughout the length of the machine to discharge through the exit opening 12. While the patty is progressing, heat from the lower burners 13 and particularly from the upper burners 14, 16 and 17 raises the temperature in the patty passageway between the openings 11 and 12 so that the patty 9 is appropriately cooked. A substantial portion of the heat is able to escape not only through the opening 11 at the entrance end, but especially through the opening 12 at the exit end. Particularly also, there is customarily sufficient space within the passageway to allow random circulation of heated air. Some of this exhausts to carry substantial energy with it.

In order to reduce the amount of warm air dissipated and to confine the heat more nearly to the broiler, there is preferably provided an array of baffles to limit or define the extent of the passageway above the conveyor through the broiler and to assist in curtailing the escape of heat to the exterior thereof. For example, there is afforded a baffle in the form of an entrance shield 26. This is made up of heat-reflecting material such as a bright metal formed to provide a horizontal top sheet 27 and connected side sheets 28 and 29. These are proportioned and spaced so that the side sheets 28 and 29 can frictionally slide over and engage with the burner housing 14 and so that the top sheet 27 can act as a stop therefor. The side sheet 29 is provided with an extension baffle sheet 31 directed from the sheet 29 across most of the gap toward the entrance opening 11. The sheet 31 is disposed at an incline or at an angle selected to reflect radiant heat from the interior back to the interior rather than outwardly through the opening 11. The extended baffle 31 is conveniently reinforced and stiffened by an upturned rim or flange 33 near the opening 11, so that the lip 33 reduces the freedom of upward flow of air within the broiler.

A very similar, in fact identical, baffle 36 is provided to fit over the end burner 17 with the corresponding baffle extension sheet 31 disposed close to the exit opening 12. This precludes substantial circulation of warm air in that vicinity and substantially confines radiant heat to the interior passageway in the broiler. In fact, the construction of the end baffles is such that one can be interchanged with the other simply by turning them end-for-end.

In addition, there are provided one or more intermediate baffles 37. Each of these is made up of a horizontal sheet 38 of heat-reflecting material designed simply to rest by gravity on the upturned flanges or edges 21 of the adjacent burner housings. The sheets 38 are of a horizontal extent so as virtually to block vertical air and heat flow between the individual, spaced-apart burner housings. Furthermore, each of the sheets 38 has a vertically extending, depending sheet 39 secured thereto. This is disposed between flanges 21 on the adjacent burner housings and extends vertically fairly close to the conveyor 8, so that the vertical extent of the passageway is reduced. That is, horizontal flow from one end of the broiler to the other, particularly from the entrance opening 11 to the exit opening 12, is substantially curtailed or reduced. There is sufficient clearance vertically between the bottom of the vertical sheet 39 and the upper portion of a hamburger patty 9 to permit free advancement, but the amount of remaining space for the transfer or flow of air is substantially cut down from normal.

The result of the added baffling is to reduce air flow through the broiler, to reduce heat emanation from the broiler either in the form of hot air or in the form of radiating heat, to confine and direct the heat more nearly to and onto the patties on the conveyor, and overall to provide a substantial saving in cooking energy.

We claim:

1. For use in a broiler having a conveyor running in a predetermined direction between an entrance opening to the broiler and an exit opening from the broiler; a plurality of burner housings above the conveyor, said burner housings having transverse, upright, side walls and a connecting, horizontal top wall; one of said burner housings being spaced in said predetermined direction from one of said openings to leave an end gap; and said burner housings being spaced apart in said predetermined direction from each other to leave a central gap between them; an array of heat reflecting baffles comprising an end shield having a top sheet and transverse, upright side sheets defining a channel adapted frictionally to engage and slide on said side walls of said housing and having a baffle sheet extending substantially in said predetermined direction across said end gap; and an intermediate shield having a horizontal sheet resting upon said burner housings and extending across said central gap, and including a vertical sheet depending centrally from said horizontal sheet.

2. A device as in claim 1 in which said baffles are of heat-reflecting material.

3. A device as in claim 1 in which said end shield is inclined with respect to said conveyor in a direction to reflect heat away from an adjacent one of said openings.

4. As a sub-combination for use with a burner housing as in claim 1, wherein said baffle comprises a single sheet of heat-reflecting material bent upon itself to provide a channel shape generally rectangular in transverse cross-section and of a size frictionally engageable over said burner housing and having extending from one of the side walls of said channel a baffle sheet projecting at an angle to said side wall.

5. As a sub-combination for use between two adjacent but spaced apart burner housings having edge flanges in opposition as in claim 1, said baffle comprising a horizontal sheet of heat-reflecting material adapted to rest on said edge flanges and with a vertical sheet of heat-reflecting material depending from the center of said horizontal sheet.

* * * * *